(12) United States Patent
Reddy

(10) Patent No.: US 6,430,466 B1
(45) Date of Patent: Aug. 6, 2002

(54) SYSTEM FOR CONTROLLING CLAMP PRESSURE IN AN AUTOMATIC MOLDING MACHINE

(75) Inventor: Suresh Baddam Reddy, Erie, PA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/378,958

(22) Filed: Aug. 23, 1999

(51) Int. Cl.$^7$ .......................... G05B 13/02; B29C 45/00
(52) U.S. Cl. .................... 700/200; 700/33; 700/45; 264/40.5; 425/149
(58) Field of Search ................. 700/197, 200, 700/32, 33, 37, 73, 8, 44, 45; 264/40.3, 40.5; 425/145, 146, 149

(56) References Cited

U.S. PATENT DOCUMENTS

| | | | |
|---|---|---|---|
| 3,857,658 A | | 12/1974 | Muzsnay .................... 425/145 |
| 4,917,540 A | | 4/1990 | Recalde ...................... 405/168 |
| 4,917,840 A | | 4/1990 | Harada et al. ............. 264/40.5 |
| 5,182,716 A | * | 1/1993 | Stroud, III et al. .......... 700/200 |
| 5,680,315 A | * | 10/1997 | Rimondi et al. ........ 364/475.03 |
| 5,786,999 A | * | 7/1998 | Spahr et al. ........... 364/475.05 |
| 5,792,483 A | * | 8/1998 | Siegrist et al. .............. 425/135 |
| 5,911,924 A | * | 6/1999 | Siegrist et al. ............. 264/40.1 |
| 6,108,587 A | * | 8/2000 | Shearer et al. .............. 700/200 |

* cited by examiner

Primary Examiner—Paul P. Gordon
(74) Attorney, Agent, or Firm—John F. Thompson; Jill M. Breedlove

(57) ABSTRACT

The present invention provides a apparatus and method for controlling the force and velocity of a piston within the clamp assembly of a injection molding machine. The control unit comprises the following elements: a PI based cascade compensator; an estimator coupled to the clamp assembly and the cascade compensator, wherein the estimator is utilized to estimate the position of the clamp assembly piston; a velocity position controller coupled to the clamp assembly and the estimator, wherein the velocity position controller is adapted to generate a velocity error signal based on the piston velocity signal; and an auto selector coupled to the cascade compensator, wherein the auto selector is adapted to select between the velocity error signal and the force error signal to generate a valve command signal. The present invention additionally employs a method for determining the velocity profile of the piston of a clamp assembly. The method comprises the following steps: determining the maximum displacement $x_s$ of the servo valve; selecting a final velocity $v_s$ of the piston; choosing a ratio $\alpha$ of the piston ramp-down interval to the servo valve displacement "x" during a ramp-up interval, selecting a desired maximum piston velocity ($v_{max}$) during the ramp-up interval and a constant speed interval; and determining servo valve displacement $x_u$ from simulations or estimate from previous cycles.

19 Claims, 9 Drawing Sheets

SYSTEM FOR CONTROLLING CLAMP PRESSURE IN AN AUTOMATIC MOLDING MACHINE

BACKGROUND OF THE INVENTION

The present invention relates to the regulation of a clamp assembly in a injection molding machine and, more particularly, to a closed loop system for controlling the pressure of a clamp assembly to optimize production efficiency in an injection molding machine.

Injection molding machines are used to mass produce plastic parts by automated injection of plastic into a mold that is opened and closed by a clamp assembly. At the end of an injection molding cycle, the clamp assembly is retracted, and the part is ejected. The next cycle is initiated by motion of the clamp from its retracted position to a position where the mold is nearly closed. During the cycle the mold machine should not be subjected to excessive pressure and forces generated by parts left behind in the mold, or incorrect positioning of the mold. In the event that parts are left behind nor incorrectly positioned in the mold the machine must be stopped and the piece removed. This causes production delay which impacts production efficiency.

More particularly, a typical injection molding process utilizes a injection molding machine 10, illustrated in FIG. 1, wherein plastic pellets (not shown) are melted and forced into a mold 20, by a clamp assembly 113 that opens and closes mold 20 during the mold injection cycle.

The clamp assembly 113 comprises a hydraulic cylinder which is mechanically coupled to a piston 27. Clamp assembly 113 further comprises a stationary platen 13 which is mechanically affixed to a mold 20, and a moving platen 12, which is coupled to piston 27. Piston 27 is adapted to hydraulically traverse from a clamp closed position to a clamp open position in an injection molding cycle by variable force applied to piston 27. A hydraulic cylinder 11 is movably coupled to piston 27. The variable force applied to piston 27 by the fluid in hydraulic cylinder 11 may be controlled by a control unit 28.

The injection molding process comprises four successive stages. The first stage called "plastication" comprises steps wherein the plastic pellets are pushed forward from a hopper 17 through a barrel 21 towards a nozzle 14 by a rotating screw 22 while being heated in barrel 21 by electric heater bands 23 surrounding barrel 21. The second stage called "injection," occurs when the plastic is pushed through nozzle 14 into a mold 20 by clamp assembly 113. The third stage called "packing," occurs when mold 20 is packed with the molten plastic. The fourth stage called "cooling," occurs when mold 20 is cooled to solidify the plastic part therein. After the completion of the solidification and cooling stages, piston 27 is retracted and the part is ejected. The injection molding machine 10 is thus ready for the process to be repeated in the next cycle.

It is desirable to protect the injection mold machine 10 during motion of piston 27 by "smoothing" the response of the clamp assembly cycle during clamp closure of piston 27 so as to prevent damage to the machine from plastic parts, remaining in the mold after having been jammed in mold 20 during the previous cycle. It is also desirable to control the stroke of piston 27 during the injection molding cycle so as to minimize the duration of the clamp cycle.

BRIEF SUMMARY OF THE INVENTION

The present invention provides an apparatus and method for controlling the force and velocity of a piston within the clamp assembly of a injection molding machine. The control unit comprises the following elements: a cascade compensator, wherein the cascade compensator is adapted to generate a force error signal having lead and lag compensation based on the desired force minus the actual force of the piston; an estimator coupled to the clamp assembly, wherein the estimator is utilized to estimate the position of the servo valve and to generate a corresponding actual force signal; a velocity and position controller coupled to the clamp assembly and the estimator, wherein the velocity and position controller is adapted to generate a velocity error signal based on the piston velocity signal; and an auto selector coupled to the cascade compensator, wherein the auto selector is adapted to select between the velocity error signal and the force error signal so as to generate the valve position command signal.

The present invention additionally employs a method for determining the velocity profile of the piston of a clamp assembly, wherein the velocity profile having a ramp-up interval, a constant speed interval, ramp-down interval; and a final touchdown interval. The method comprises the following steps: determining the maximum displacement $x_f$ of the servo valve; selecting a final touch down velocity $v_s$ of the piston; choosing a ratio $\alpha$ of the piston ramp-down interval to the servo valve displacement "$x_v$" during the ramp-up interval, selecting a desired maximum piston velocity ($v_{max}$) during the ramp-up interval and constant speed interval; and determining servo valve displacement $x_u$ from simulations or estimate from previous cycles.

DETAILED DESCRIPTION OF THE INVENTION

Figure 1:
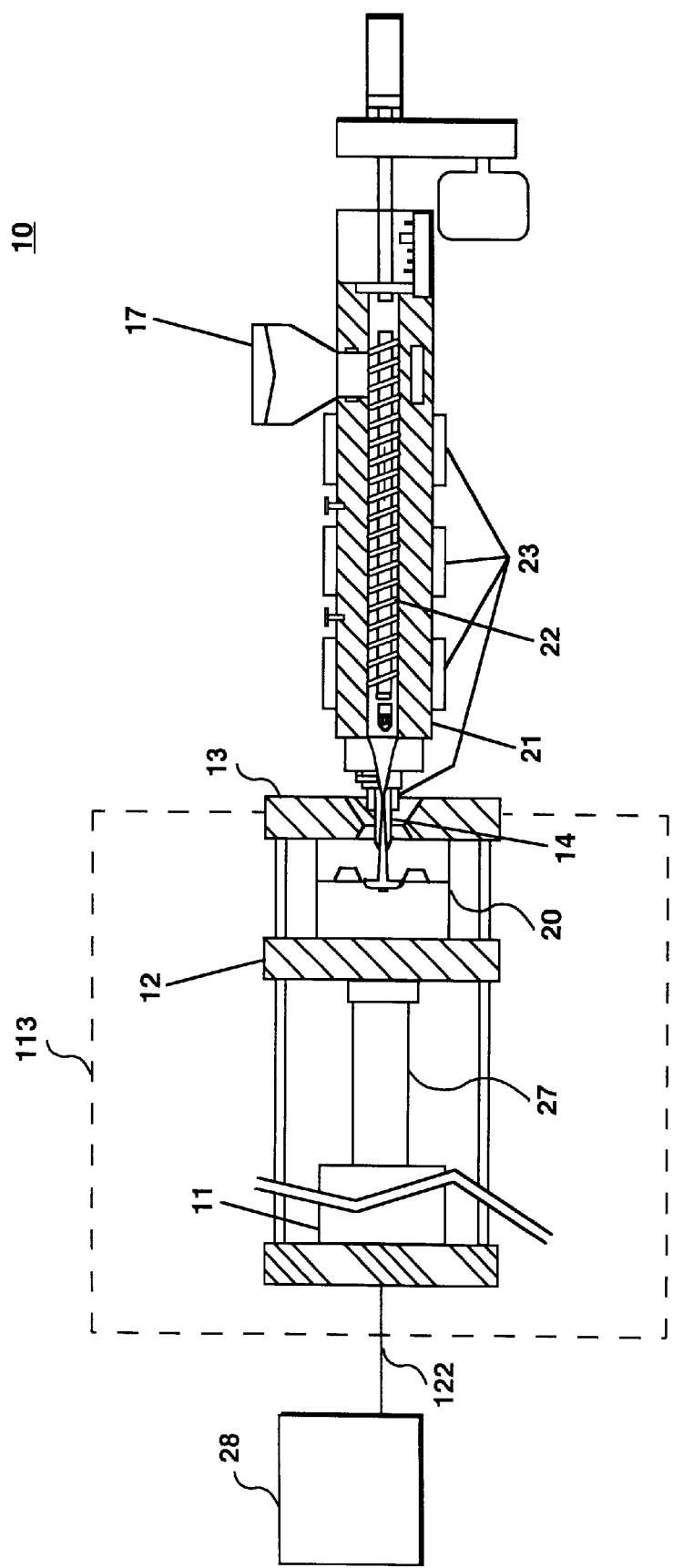
FIG. 1 is a prior art illustration of an injection molding machine.
Figure 2:
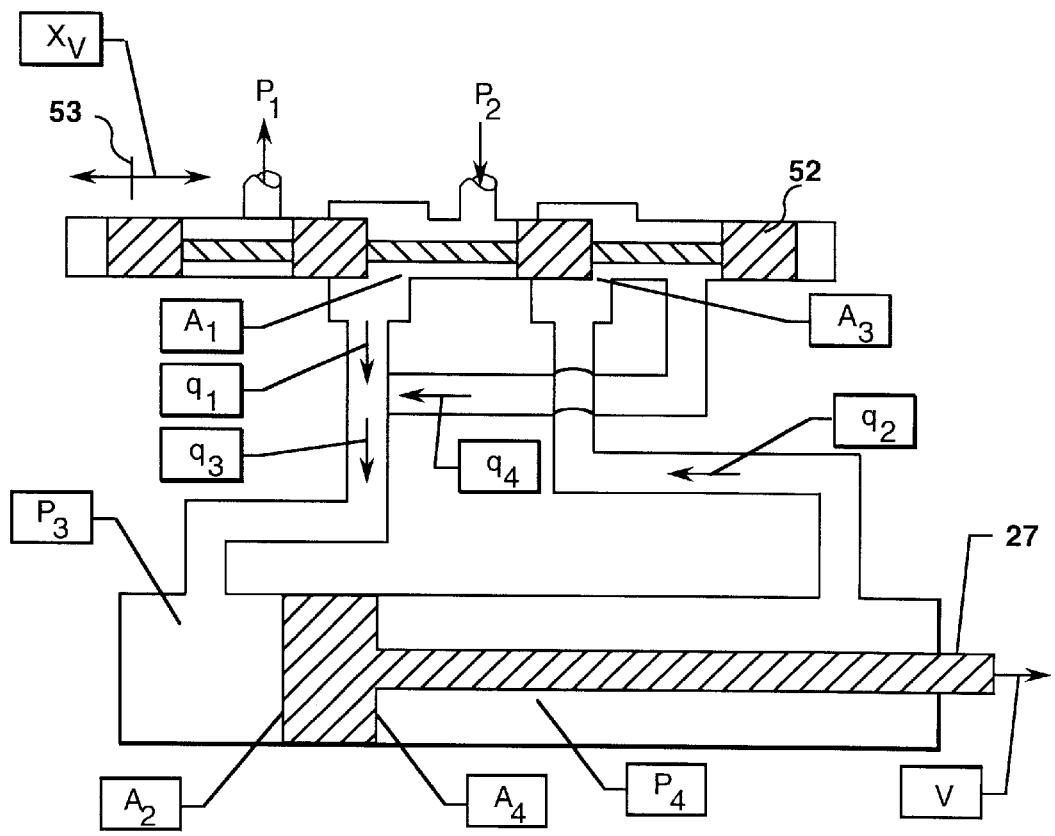
FIG. 2 is a functional block diagram of the piston portion of the clamp assembly of FIG. 1.

Referring now to FIGS. 1 and 2, in which like elements have like reference numbers, a prior art illustration of an injection molding machine 10 is shown. Control unit 28 generates a servo valve position command signal 122 that acts to control the velocity of piston 27 enabling piston to traverse from a clamp open position to a clamp closed position. More particularly, piston assembly 50 comprises servo valve 52 which is actuated by control unit 28 to cause servo valve 52 to be displaced a distance "$x_v$" from a null position 53 during normal operation. This displacement regulates the net pressure ($P_2$ inlet pressure minus $P_1$ return pressure) of hydraulic fluid on piston 27 so as to cause piston 27 to traverse from the clamp open position to the clamp closed position at a desired velocity.

The present invention is employed to estimate and regulate the force of clamp assembly 113 on the mold/plastic part as it is forged during the clamp cycle. The force exerted by piston 27 on mold 20 may be estimated by equation (1) listed below:

$$F = (P_3 A_2 - P_4 A_4) - Ma \qquad \text{equation 1}$$

where "F" is the force exerted by piston 27 on the mold, $P_3$ is the hydraulic pressure on a first surface of piston 27, $P_4$ is the hydraulic pressure on a second surface of piston 27, $A_2$ is the first surface area of piston 27, $A_4$ is the second surface area of piston 27, "M" is the mass of mold, 20 and "a" is the acceleration of piston 27.

Generally, the hydraulic fluid flow rate "Q" is related to the difference in pressure on both sides of servo valve 52 and the area of the servo valve opening according to the general mathematical relationship illustrated in equation 2

$$Q = C_d A \sqrt{\frac{2 \Delta P}{\rho}} \qquad \text{equation 2}$$

where $C_d$ is a fluid pressure coefficient, "$\rho$" is the fluid density, "A" is the area of the orifice through with the fluid passes, and $\Delta P$ is the pressure differential across the orifice. Additionally, the compressibility effect in the hydraulic fluid is defined by equation 3 illustrated below, $$\frac{dV}{dt} = \frac{V}{\beta} \frac{dP}{dt} \qquad \text{equation 3}$$

where "V" is the volume of the hydraulic fluid, $\beta$ is the bulk modulus, and dP/dt is the derivative of the pressure with respect to time. From these three equations the following first order, non-linear differential equations relating to pressures, velocity and valve opening were derived, $$F = P_3 A_2 - P_4 A_4 - Ma \qquad \text{equation 4}$$

where "F" is force exerted by piston 27 on mold 20 and "a" is the acceleration of the piston.

$$\frac{dp_3}{dt} = \frac{\beta(Q_4 - A_2 v)}{V_1 + A_2 x} \qquad \text{equation 5}$$

where $dp_3/dt$ is the derivative of pressure on the first surface $A_2$ of piston 27 with respect to time, and $Q_4$ is the flow rate of the hydraulic fluid into the left chamber, $V_1$ is the initial volume of the fluid in the left chamber, "x" is displacement of the piston from initial position and "v" is the velocity of the piston $$\frac{dp_4}{dt} = \frac{\beta(-Q_2 + A_4 v)}{V_2 - A_4 x} \qquad \text{equation 6}$$

where $dp_4/dt$ is the derivative of the pressure on the second surface $A_4$ of piston 27 with respect to time, $Q_2$ is the flow rate of the hydraulic fluid returning from piston 27 to servo valve 52 and $V_2$ is the initial volume of the fluid in contact with area $A_4$. Simulations were conducted using equations 4–6 having the following limitations. The maximum velocity of piston 27 did not exceed about 2,000 millimeters/second. The maximum displacement "$x_v$" of servo valve 52 was not be greater than about 650 millimeters. The above limitations were employed using a mold mass "M" having values in a range from about 1800 kg to about 5400 kg.

From the simulations performed using equations 2 through 7, control algorithms were developed to regulate the force exerted by piston 27 on mold 20 and the stroke duration of piston 27, as further described below.

Figure 3:
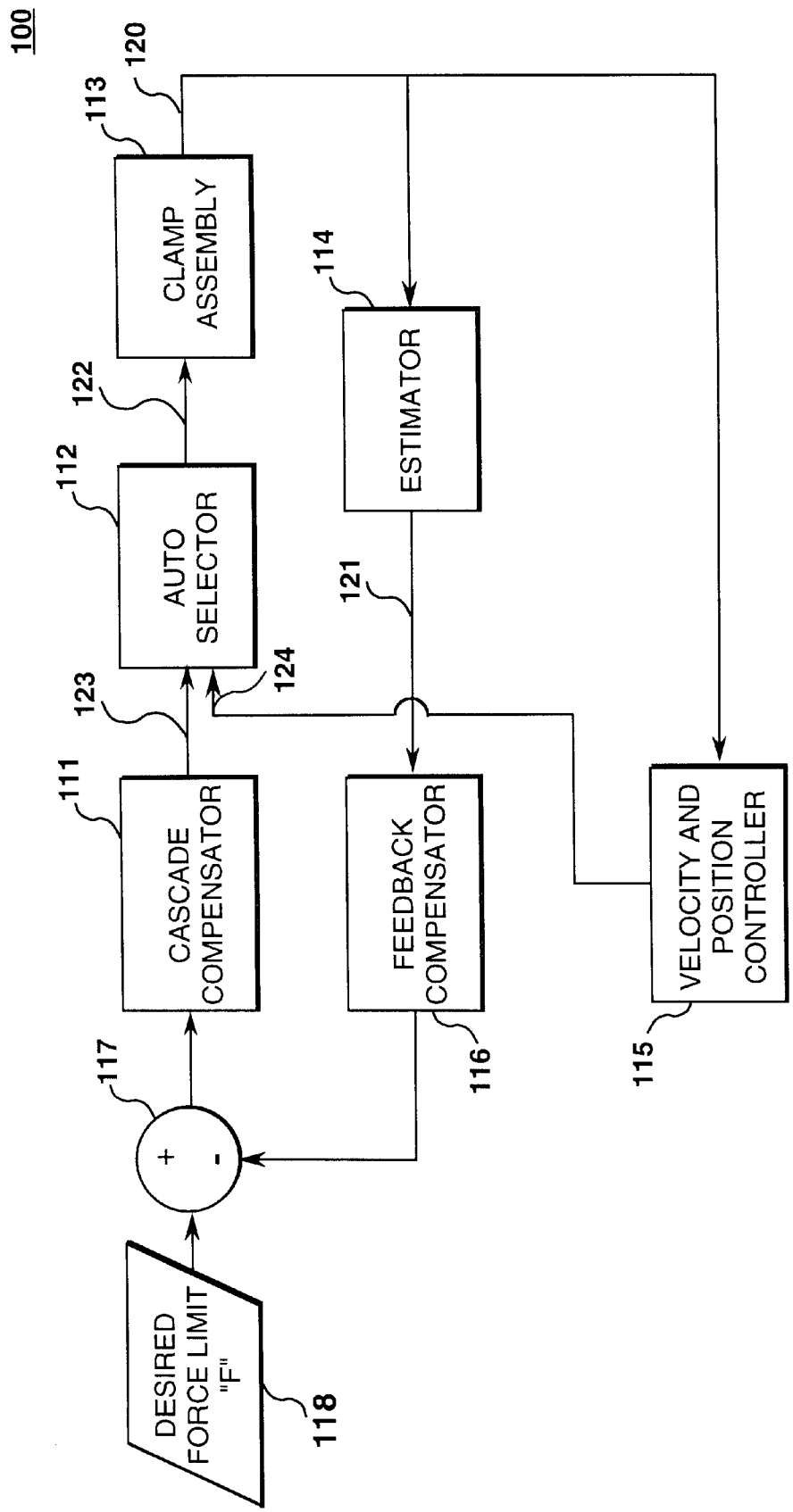
FIG. 3 is a functional block diagram of the clamp assembly and control unit of the present invention.
Figure 4:
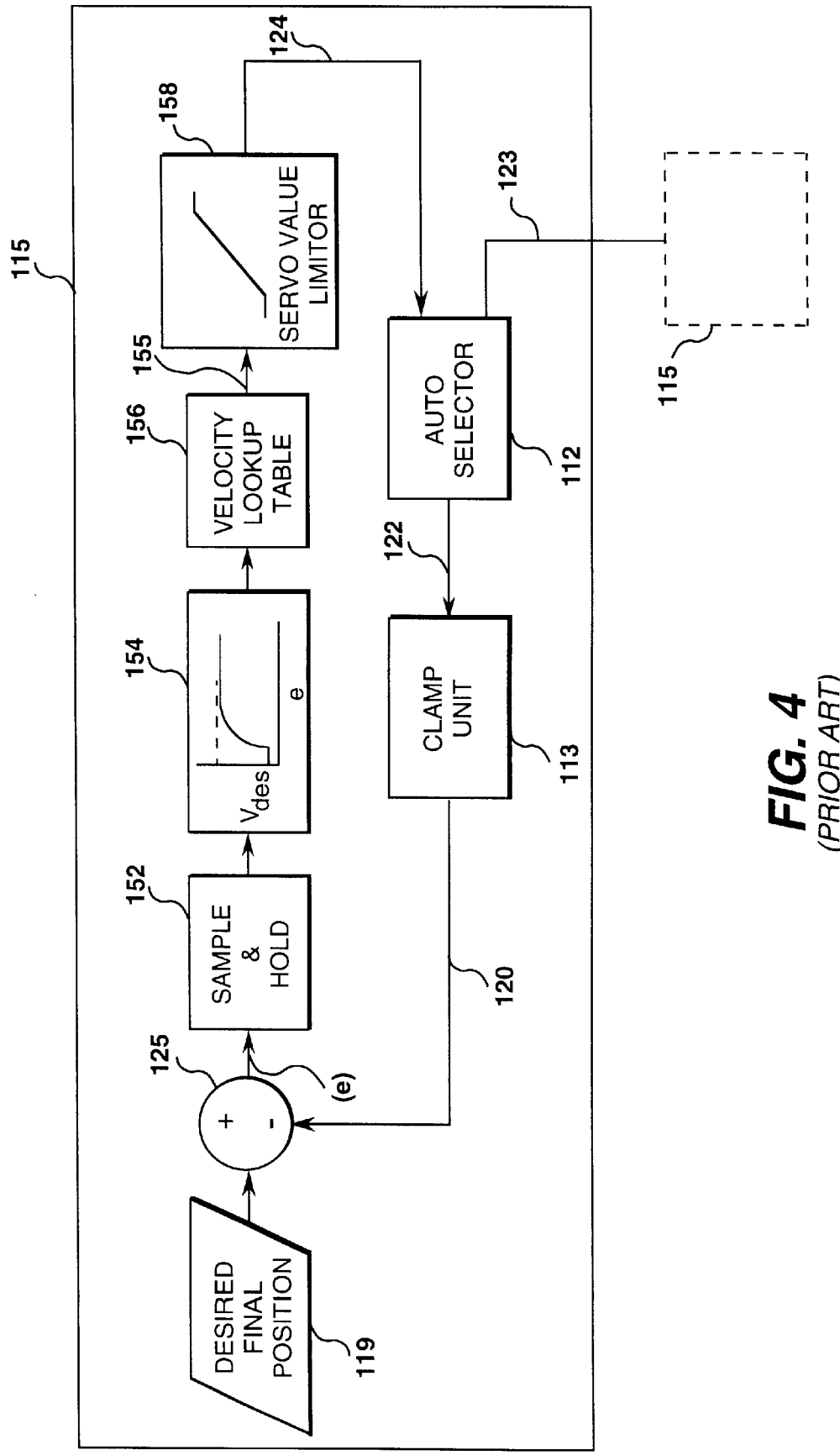
FIG. 4 is a schematic block diagram of a typical velocity position controller.
Figure 8:
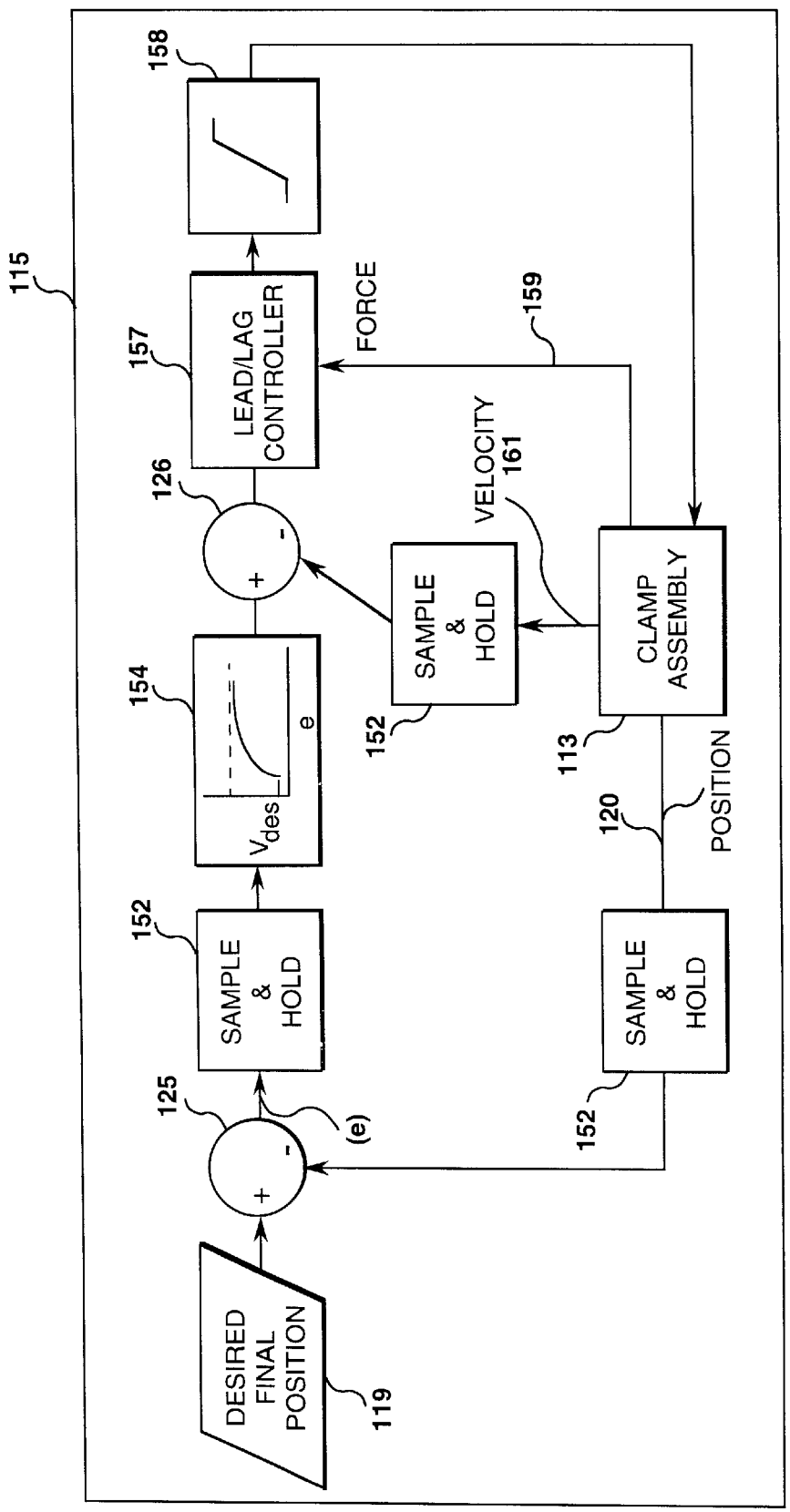
FIG. 8 is a schematic block diagram of the velocity position controller of the present invention.

Referring now to FIG. 3, which illustrates a functional block diagram of the clamp assembly controller 100 and to FIGS. 4 and 8, showing further detail of a velocity position controller 115, in which like elements have like reference numbers.

Clamp assembly controller 100, comprises desired force limit 118, summer 117, cascade compensator 111, auto selector 112, clamp assembly 113, estimator 114, and velocity position controller 115. Clamp assembly controller 100 optionally may further comprise feedback compensator 116.

Desired force limit "F" 118 provides a maximum force "F" that piston 27 may generate. This force limit is established by the maximum force that the piston assembly 50 may generate so as not to cause excessive force on mold 20. The maximum force "F" is selectable and depends on the size of the machine and mold.

Force summer 117 generates a difference signal, referred to as the force difference signal, between the desired force "F" and actual force signal 121 produced by clamp assembly 113. Alternatively, force summer 117 generates force difference signal that is the difference between the desired force signal "F" and the force feedback signal generated by feedback compensator 116.

Cascade comparator 111 is a lead/lag controller, having proportional and integral gains, that provides lead and lag compensation to the force difference signal generated by force summer 117. The proportional and integral gains values are chosen to provide damped response without oscillations, within a specified bandwidth. The gains are selected through conventional compensation techniques and simulations.

Figure 5:
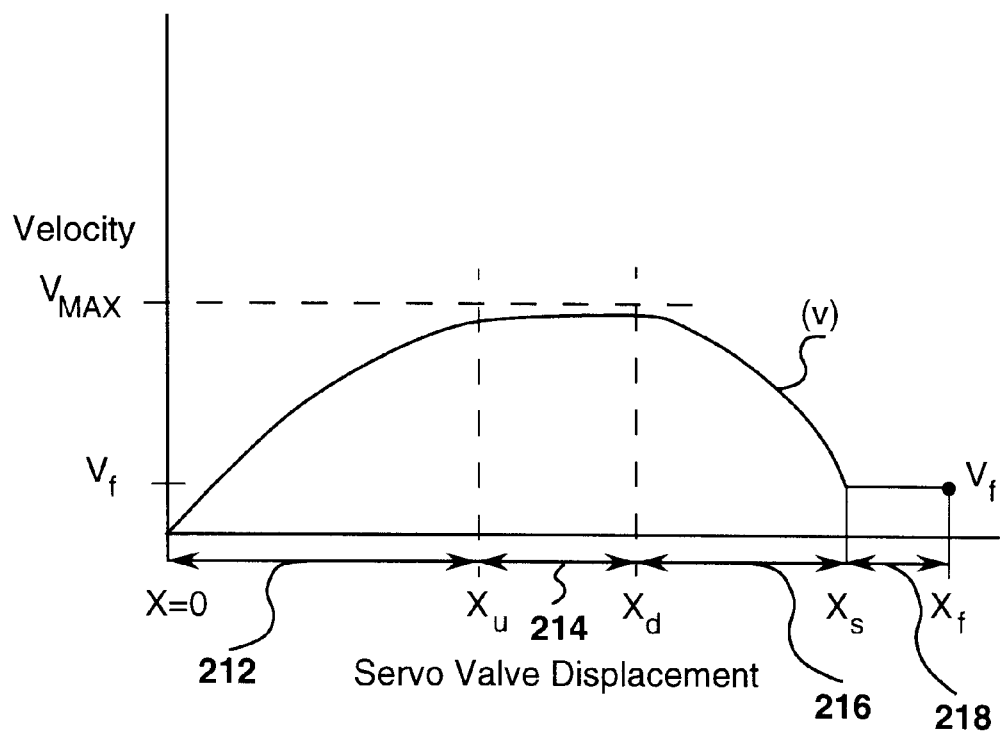
FIG. 5 is a graphical illustration of the piston velocity profile of the velocity position controller of FIG. 8.

Velocity and position controller 115 generates a piston velocity signal having a piston velocity profile, illustrated in FIG. 5, in correspondence with the servo valve displacement "$x_v$" as represented by piston velocity signal 120. Piston velocity profile 200 (FIG. 5) is a graphical illustration of an exemplary piston velocity waveform 210. A maximum velocity ($v_{max}$) is the maximum mechanical velocity of piston 27. A final velocity ($v_f$) is the final estimated velocity of piston 27. A ramp up section 212, having a servo valve displacement interval extending from $x_v=0$ to $x_v=x_u$, is defined as the interval where the piston velocity increases from about zero to about 99 percent of $v_{max}$. A constant speed interval 214, having a servo valve displacement interval extending from $x_u$ to $x_d$, is the phase where the piston velocity is substantially constant, typically about 99% of $v_{max}$. A ramp down interval 216, having a servo valve displacement interval extending from $x_d$ to $x_s$, is the phase in which the piston velocity is reduced to $v_f$, typically much less than $v_{max}$. In one exemplary embodiment $v_{max}$ may be about 2000 meters/second and $v_f$ may be about 40 meters/second. A touchdown interval 218, having a servo valve displacement interval extending from $x_s$ to $x_f$, is the phase where the piston velocity is constant at about $v_f$. Each of the intervals $x_u$, $x_d$, and $x_s$ are selected based on the velocity and position control process described below.

Auto selector 112 selects a force control function 123 or a velocity control function 124 to control clamp assembly

113. The force control function 123 is represented by the signal generated by cascade compensator 111 and the velocity control function 124 is represented by the output of the velocity and position controller 115 (e). Auto selector 112 selects the minimum of the two control functions as valve command 122. Servo valve command signal 122 is coupled to clamp assembly 113.

Clamp assembly 113 operates as described above to open and close mold 20. Clamp assembly 113 generates a piston velocity signal 120 in correspondence with displacement "$x_v$" of the servo valve 52.

Estimator 114 operates to measure the actual force generated by piston 27. Alternatively, estimator 114 operates to estimate the force of piston 27 utilizing equation 4, where the acceleration of piston 27 is calculated using piston velocity signal 120 (based on approximate differentiation), $P_3$, and $P_4$. If piston velocity is not directly measured, it can be estimated from the piston position signal. Estimator 114 generates actual force signal 121 in correspondence with the measured or calculated force of piston 27.

In another alternative embodiment of the present invention, feedback compensator 116 may be employed in control 100 to provide lead/lag compensation to actual force signal 121. The compensator may be designed to cancel sensor lags and add damping to the closed loop system.

Figure 7A:
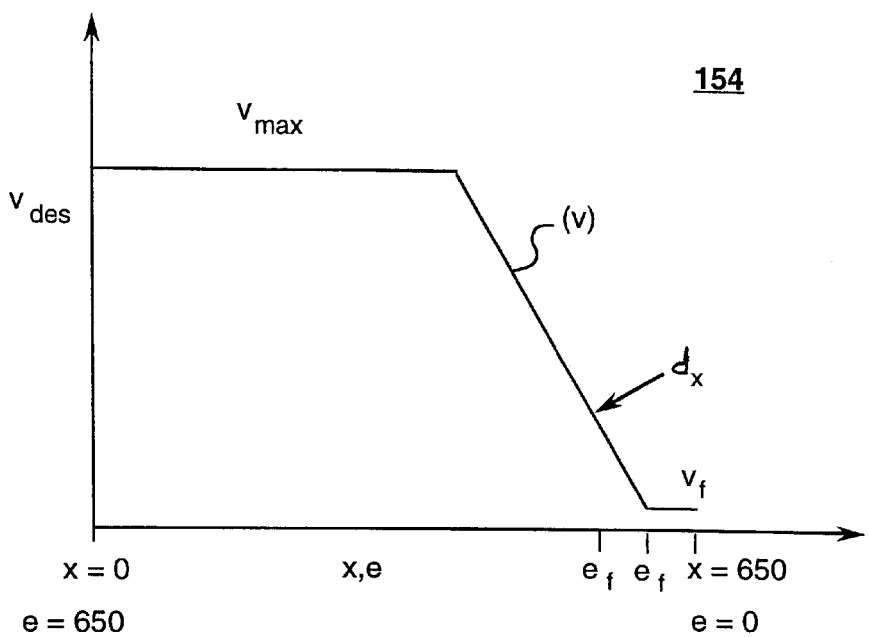
FIG. 7A is a graphical illustration of a piston velocity and servo valve position profile of the present invention which employs a linear response to the servo valve error signal.
Figure 7B:
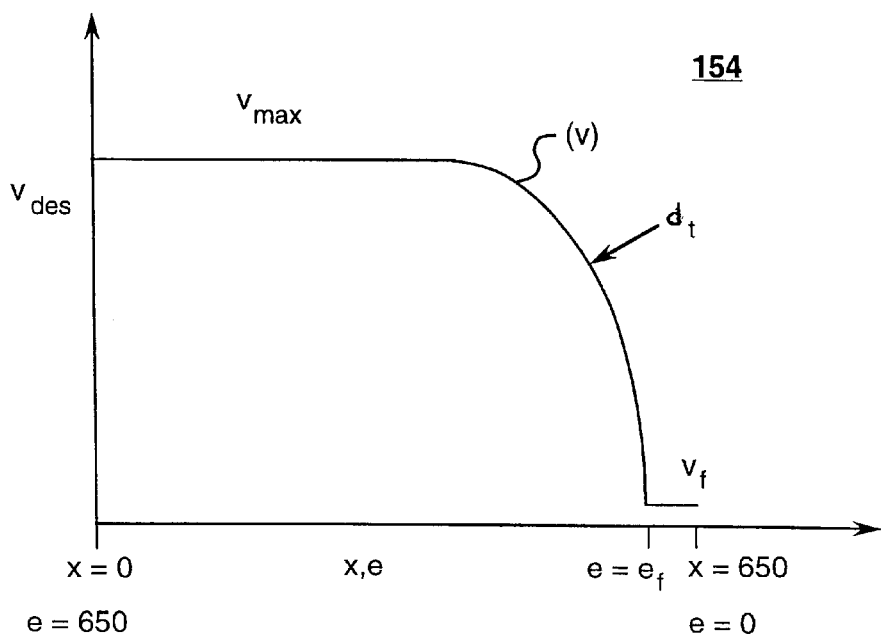
FIG. 7B is a graphical illustration of a piston velocity and servo valve position profile of the present invention which employs a quadratic response to the servo valve error signal.

Desired final position 119 provides a final position $x_f$ set point for piston 27. The final position $x_f$ is determined based on the desired position for clamp closing. Summer 125 generates a position error signal, referred to as the position error signal (e), which is the difference between the desired final position and the actual position generated by the clamp assembly 113. Desired velocity schedule 154 is a schedule of position error signal (e) versus the desired piston velocity, as illustrated in FIGS. 7A and 7B. Desired velocity schedule 154 generates a desired velocity signal (v). Between zero and small error $e_f$, i.e., near final position, the desired velocity is the touch down velocity, $v_f$. The final velocity is established by the maximum necessary velocity of piston 27 in touchdown interval 218 (FIG. 5). This final velocity must be low enough to provide safe mold closing and high enough to minimize the cycle time of clamp assembly 113. In an exemplary embodiment the final velocity is in a range from about 10 to about 50 meters/second. At very high position error, i.e., near the initial position, the desired velocity is the maximum velocity, $v_{max}$.

In between $v_{max}$ and $v_f$, the profile of desired velocity verses error depends on the designer's choice. Here, consideration is given to two choices: 1) constant deceleration (dt) with respect to time, and 2) constant deceleration ($d_x$) with respect to position. If the deceleration is constant with respect to position and is equal to $d_x$, then $v=v_f+d_x(e-e_f)$ from $e=e_f$ onwards, until "v" becomes $v_{max}$. If the deceleration is constant with respect to time and is equal to dt, then $v=\sqrt{v_f^2+2d_t(e-e_f)}$ from $e=e_f$ onwards, until "v" becomes $v_{max}$.

The profile of velocity schedule 154 is selected to minimize the cycle time of clamp assembly 113 while at the same time insuring system stability.

Servo valve displacement look-up table 156 may be employed to provide a valve drive signal which corresponds with the desired velocity, as output by 154. Servo valve limiter 158 limits the valve command to reasonable, physical limits—these may be the same as saturation limits for servo valve 52.

FIG. 8 provides further detail of an alternative velocity and position controller 115 of the present invention, illustrated in FIG. 3. The present position and velocity controller 115 is adapted to employ a closed loop around the piston force, velocity, and position. Velocity and position controller 115, described in FIG. 4, further comprises a lead/lag controller 157 which is coupled to limiter 158. Clamp assembly 113 generates an actual force signal 159, a piston position signal 120, and a piston velocity signal 161. The force signal 159 is coupled to controller 157. Piston position signal 120 is coupled to a sample and hold block 152 and the piston velocity signal 161 is coupled to a summer 126 via a sample & hold 152. Piston and velocity controller 115 is adapted to control the piston position based on piston force, velocity, and position. Each component operates as described above to regulate piston force, velocity, and position to limit the piston force and the maximize the cycle time of the piston.

Figure 6A:
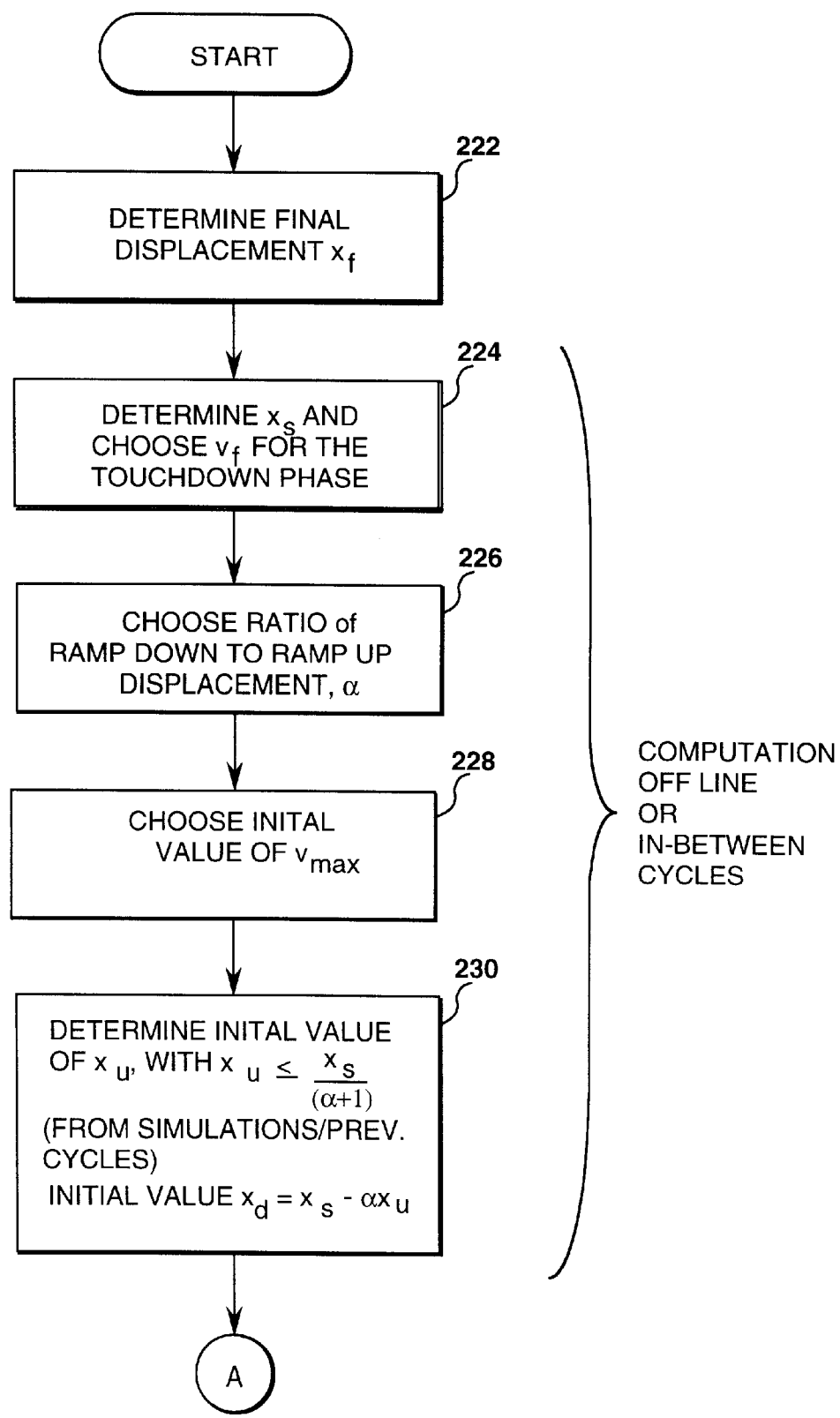
FIGS. 6A and 6B are process flow block diagrams of the velocity position controller of FIG. 5.
Figure 6B:
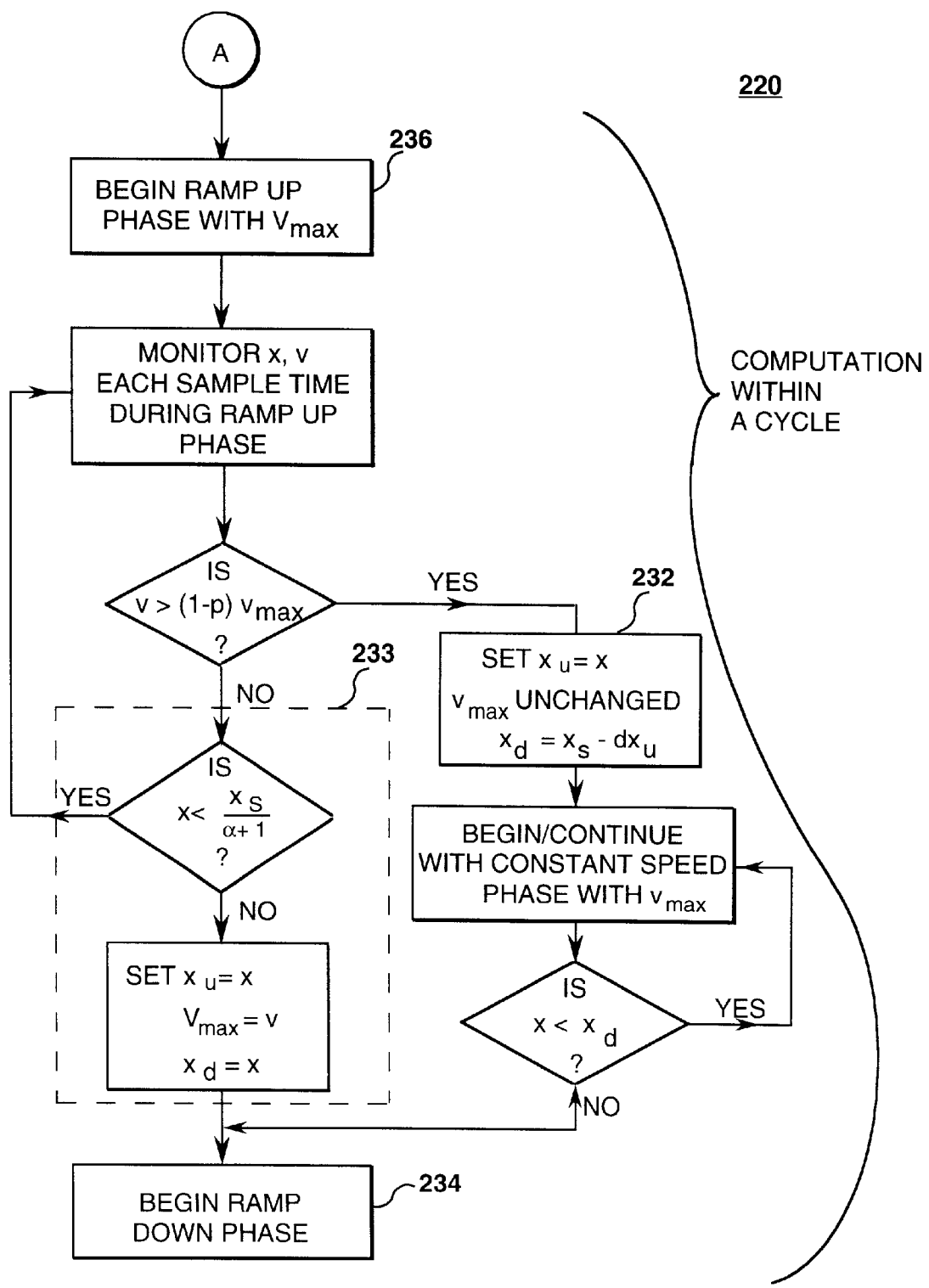

The following steps, illustrated in FIGS. 6A and 6B, identify a process 220 that may be performed by a computer or circuit to determine the velocity profile of piston 27, identified in FIGS. 6A and 6B.

Step 222. Determine the total servo valve displacement $x_f$ from the initial to the final position $x_v=0$ to $x_v=x_f$ when mold 20 is closing.

Step 224. Select a servo valve displacement ($x_s$) for mold closing position for the beginning of touchdown phase $x_s$ at $v_f$. The closer $x_s$ is to $x_f$ the less the cycle time. For example, $x_s$ has a value that is about 99 percent of $x_f$.

Step 226. Choose a ratio $\alpha$ of the servo valve displacement "$x_v$" during ramp-down interval 216 to the servo valve displacement "$x_v$" during ramp-up interval 212, according to equation 7 illustrated below.

$$\alpha = \frac{(x_s - x_d)}{x_u} \qquad \text{equation 7}$$

$x_u$ is the displacement reached by the piston, by the time "v" reaches about 99% of $v_{max}$. $x_d$ is the displacement where the ramp down phase begins. Note that $x_d \geq x_u$. A numerical value for $\alpha$ of about 1.0 or slightly higher/lower may be chosen. Values of $\alpha$ much less than 1.0 should not be selected because they result in mold injection system instability during a rapid ramp down phase. Very high values of $\alpha$ lead to larger cycle time.

Step 228. Select a piston maximum velocity ($v_{max}$) during the ramp-up interval 212 and constant speed interval 214. The desired piston velocity depends on the machine and mold size.

Step 230. Determine $x_u$ from simulations or estimate from previous cycles. It is noted that $x_u$ is approximately proportional to mold mass "M". $X_u$ can also be estimated from previous cycles. $X_u$ should be chosen according to the mathematical relationship $$x_u \leq \frac{x_s}{(\alpha + 1)} \qquad \text{equation 8}$$

so that $x_d$ is greater than or equal to $x_u$. In the event that $x_u$ does not satisfy equation 8, $v_{max}$ may be reduced to satisfy the relationship between $x_u$ and $x_s$ in equation 8.

Step 236. Begin ramp up phase with $v_{max}$.

Step 232. If $$x_u < \frac{x_s}{(\alpha + 1)},$$

choose $x_d = x_s - \alpha x_u$. If $$x_u = \frac{x_s}{(\alpha+1)},$$

choose $x_d = x_u$.

Step 233. If at $$x = \frac{x_s}{(\alpha+1)},$$

$v < 99\%$ of $v_{max}$, it implies that $x_u > x_s/(\alpha+1)$. Then, change $v_{max}$, $x_u$, and $x_d$ as follows:

$v_{max} = v$ at $x = x_s/(\alpha+1)$, $x_u = x_s/(\alpha+1)$, and set $x_d = x_u$.

Step 234. Select the piston deceleration profile during ramp-down interval 218 according to a linear profile as further described below. For the linear deceleration profile the slope (dx) is estimated, according to equation 9, based on linear trajectory from $x_d$ to $x_s$. The linear deceleration profile is illustrated in FIG. 7A.

$$dx = \frac{(v_{max} - v_f)}{\alpha x_u} \qquad \text{equation 9}$$

Alternatively, a quadratic profile is a more accurate estimate of the deceleration profile of piston 27. When the quadratic deceleration profile is utilized the profile is estimated according to equation 10. The quadratic deceleration profile is illustrated in FIG. 7B.

$$dt = \frac{(v_{max}^2 - v_f^2)}{2\alpha x_u} \qquad \text{equation 10}$$

It should be noted that steps 222 through 230 may be executed on the "fly", that is, during a mold machine cycle after piston 27 has complete the ramp-up interval 212 of it trajectory or off line.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A control unit for controlling the force and velocity of a piston on a mold within the clamp assembly of a injection molding machine, based on a servo valve command signal which acts to operate a servo valve, said control unit comprising:
   a cascade compensator, wherein said cascade compensator is adapted to generate the valve command signal, based on comparison of a desired force and an estimated actual force of the piston on the mold;
   an estimator coupled to the clamp assembly, wherein said estimator is adapted to estimate an actual force using cylinder pressure and a piston position signal;
   a position and velocity controller being coupled to the clamp assembly and coupled to said estimator, wherein said position and velocity controller is adapted to generate the valve command signal based on desired position and velocity profiles; and
   an auto selector being coupled to said cascade compensator, wherein said auto selector is adapted to select between a velocity control function signal and a force control function signal so as to generate the servo valve command signal.

2. The control unit as recited in claim 1, further comprising a desired force limit, wherein said desired force limit is adapted to generate a desired force limit signal.

3. The control unit as recited in claim 1, further comprising a feedback compensator being coupled to said estimator, wherein said feedback compensator is adapted to generate a feedback signal in correspondence with said estimated actual force signal.

4. The control unit as recited in claim 1, wherein said position and velocity controller further comprises:
   a desired velocity scheduler adapted to generate a velocity request signal based on a position error signal (e); and
   a servo valve look-up table being coupled to said desired velocity scheduler, wherein said servo valve look-up table is adapted to generate the servo valve command signal in correspondence with said velocity request signal.

5. The control unit as recited in claim 4, wherein said desired velocity scheduler is adapted to generate said velocity schedule signal based on said position error signal (e).

6. The control unit as recited in claim 5, further comprising a lead/lag controller coupled to said clamp assembly and said estimator, wherein said lead/lag controller provides a closed loop response between the desired velocity and actual velocity.

7. The control unit as recited in claim 6, wherein a ramp up velocity of the servo valve has an upper limit of $v_{max}$, wherein the final touch down velocity of the servo valve is $v_f$ based on error signal (e), and wherein a ramp down deceleration of the servo valve is constant with respect to time and position.

8. The control unit as recited in claim 7, wherein the ramp down velocity of the servo valve is constant with respect to time.

9. The control unit as recited in claim 7, wherein the ramp down velocity of the servo valve is constant with respect to position.

10. A method for determining the velocity profile of the piston of a clamp assembly, wherein the piston velocity is controlled by the operation of a servo valve within the clamp assembly, and wherein the displacement of the servo valve is controllable, the velocity profile having a ramp-up interval, a constant speed interval, ramp-down interval; and a touchdown interval, said method comprising the following steps:
   determining a maximum displacement $x_s$ of the servo valve;
   selecting a final velocity of the piston ($v_f$);
   choosing a ratio $\alpha$ of a piston ramp-down interval to the servo valve displacement "x" during the ramp-up interval, according to equation $$\alpha = \frac{(x_s - x_d)}{x_u}$$

where $x_u$ is a servo valve displacement and $x_d$ is a displacement where a ramp down interval begins;
   selecting a desired maximum piston velocity ($v_{max}$) during the ramp-up interval and constant speed interval; and
   determining the servo valve displacement $x_u$ from simulations or estimate from previous cycles according to a mathematical relationship $$x_u \le \frac{x_s}{(\alpha+1)}.$$

11. The method as recited in claim 10, further comprising the step of choosing a servo valve displacement of $x_d=x_s-\alpha x_u$ wherein $$x_u < \frac{x_s}{(\alpha+1)}.$$

12. The method as recited in claim 11, further comprising the step of choosing a servo valve displacement of $x_d=x_u$ wherein $$x_u = \frac{x_s}{(\alpha+1)}.$$

13. The method as recited in claim 12, further comprising the step of selecting a piston deceleration profile during the ramp-down interval according to a linear and a quadratic velocity profile.

14. The method as recited in claim 13, further comprising the step of determining said linear velocity profile having a slope ($d_x$) according to the equation $$d_x = \frac{(v_{max}-v_f)}{\alpha x_u}$$

based on the piston having a linear velocity trajectory from $x_d$ to $x_s$.

15. The method as recited in claim 12, further comprising the step of selecting the piston deceleration profile during the ramp-down interval according to a quadratic velocity profile.

16. The method as recited in claim 15, further comprising the step of determining said quadratic velocity profile ($d_t$) according to the equation $$d_t = \frac{(v_{max}^2-v_f^2)}{2\alpha x_u}.$$

17. A control unit for controlling the force and velocity of a piston on a mold within the clamp assembly of a injection molding machine, based on a servo valve command signal which acts to operate a servo valve, said control unit comprising:
 a desired force limit, wherein said desired force limit is adapted to generate a desired force limit signal;
 a cascade compensator connected to the desired force limit, wherein said cascade compensator is adapted to generate the valve command signal, based on comparison of the desired force and an estimated actual force of the piston on the mold;
 an estimator coupled to the clamp assembly, wherein said estimator is adapted to estimate an actual force using cylinder pressure and a piston position signal;
 a position and velocity controller being coupled to the clamp assembly and coupled to said estimator, wherein said position and velocity controller is adapted to generate the valve command signal based on desired position and velocity profiles;
 an auto selector being coupled to said cascade compensator, wherein said auto selector is adapted to select between a velocity control function signal and a force control function signal so as to generate the servo valve command signal; and
 a feedback compensator being coupled to said estimator, wherein said feedback compensator is adapted to generate a feedback signal in correspondence with said estimated actual force signal.

18. A method for determining the velocity profile of the piston of a clamp assembly, wherein the piston velocity is controlled by the operation of a servo valve within the clamp assembly, and wherein the displacement of the servo valve is controllable, the velocity profile having a ramp-up interval, a constant speed interval, ramp-down interval; and a touchdown interval, said method comprising the steps of:
 determining a maximum displacement $x_s$ of the servo valve;
 selecting a final velocity of the piston ($v_f$);
 choosing a ratio $\alpha$ of a piston ramp-down interval to the servo valve displacement "x" during the ramp-up interval, according to equation $\alpha=(x_s-x_d)/x_u$ where $x_u$ is a servo valve displacement and $x_d$ is a displacement where a ramp down interval begins;
 selecting a desired maximum piston velocity ($v_{max}$) during the ramp-up interval and constant speed interval;
 determining the servo valve displacement $x_u$ from simulations or estimate from previous cycles according to a mathematical relationship $$x_u \le \frac{x_s}{(\alpha+1)};$$

and
 selecting a piston deceleration profile during the ramp-down interval according to a linear velocity profile.

19. The method as recited in claim 18 wherein the step of selecting the piston deceleration profile during the ramp-down interval also selects the piston deceleration according to a quadratic velocity profile.

* * * * *